(12) United States Patent
Eaton

(10) Patent No.: US 7,260,364 B2
(45) Date of Patent: Aug. 21, 2007

(54) REVERSE MOUNTED MICRO-SPEAKER ASSEMBLIES AND MOBILE TERMINALS INCLUDING THE SAME

(75) Inventor: William Chris Eaton, Cary, NC (US)

(73) Assignee: Sony Ericsson Mobile Communications AB (SE)

( * ) Notice: Subject to any disclaimer, the term of this patent is extended or adjusted under 35 U.S.C. 154(b) by 851 days.

(21) Appl. No.: 10/449,523

(22) Filed: May 30, 2003

(65) Prior Publication Data

US 2004/0240698 A1 Dec. 2, 2004

(51) Int. Cl.
*H04B 1/38* (2006.01)

(52) U.S. Cl. ............... 455/90.1; 455/347; 455/350; 379/433.02; 379/433.03; 381/337; 381/345

(58) Field of Classification Search ............. 455/575.1, 455/575.5, 575.7, 575.8, 90.1–90.3, 347, 455/350; 381/350, 345, 337, 338, 351; 379/330, 379/428.01, 433.02, 433.03
See application file for complete search history.

(56) References Cited

U.S. PATENT DOCUMENTS

| | | | |
|---|---|---|---|
| 4,679,233 A * | 7/1987 | Richardson et al. ... | 379/433.02 |
| 6,321,070 B1 * | 11/2001 | Clark et al. ............. | 455/575.1 |
| 6,389,146 B1 | 5/2002 | Croft, III ................ | 381/345 |
| 6,795,719 B2 * | 9/2004 | Miyashita et al. ....... | 455/575.3 |
| 7,042,986 B1 * | 5/2006 | Lashley et al. .......... | 379/52 |
| 7,110,536 B2 * | 9/2006 | Hampton et al. ....... | 379/433.02 |
| 7,197,956 B2 * | 4/2007 | Bieber et al. ........... | 74/422 |
| 2004/0041726 A1 * | 3/2004 | Tamiya et al. .......... | 342/28 |

FOREIGN PATENT DOCUMENTS

| | | |
|---|---|---|
| EP | 1026868 A1 | 8/2000 |
| WO | 02/34006 A2 | 4/2002 |

OTHER PUBLICATIONS

International Search Report for PCT/IB2004/000083 mailing date Jul. 9, 2004.
Written Opinion of the International Searching Authority for PCT/IB2004/000083, date N/A.
Sony Ericsson Mobile Communications AB, International Application No. PCT/IB2004/000083, Written Opinion, Jul. 9, 2004.
Sony Ericsson Mobile Communications AB, International Application No. PCT/IB2004/000083, International Search Report, Jul. 9, 2004.
Sony Ericsson Mobile Communications AB, International Application No. PCT/IB2004/000083, International Preliminary Examination Report, Feb. 21, 2005.

* cited by examiner

*Primary Examiner*—Congvan Tran
(74) *Attorney, Agent, or Firm*—Moore & Van Allen PLLC

(57) ABSTRACT

Micro-speaker assemblies and mobile terminals including micro-speaker assemblies are provided. The micro-speaker assembly includes a micro-speaker positioned in a housing. A low frequency back tuning volume is adjacent a front face of the micro-speaker and a high frequency forward tuning volume is adjacent a back face of the micro-speaker. A passageway extends from the forward tuning volume to an opening in the housing.

64 Claims, 9 Drawing Sheets

REVERSE MOUNTED MICRO-SPEAKER ASSEMBLIES AND MOBILE TERMINALS INCLUDING THE SAME

BACKGROUND OF THE INVENTION

The present invention relates to speaker assemblies for personal use such as in mobile terminals and, more particularly, to tuned micro-speaker assemblies.

Manufacturers and designers of personal electronic devices, such as cellular radio telephones, frequently seek to reduce the overall dimensions of such devices while maintaining attractive style characteristics for the devices. One consequence of the reduced size for such devices that include a speaker is that less space may be available for the speaker. Furthermore, a variety of audio signal generation capabilities may be desired in such personal electronic devices including buzzers, voice signal generation and/or music or other higher frequency band signal reproduction and playback.

As the space available for the hardware supporting the audio signal generation capabilities decreases in the personal electronic devices, it may become more difficult to support multiple sound emitting output devices and the space available for each such device may become smaller. Furthermore, increased functionality in such personal electronic devices may require more of the reduced available space to be utilized for other functionality of the device. The reduction in the size of the audio output devices may also increase the difficulty of providing a desirable loudness level for signals, such as buzzer alert signals. In addition, to the extent features of the audio output device(s) are presented externally on the personal electronic device, the impact of those features on the appearance of the product and the flexibility to place such visible features at different locations on the device may become important.

A micro-speaker is typically positioned in a personal electronic device with its front face or side ported (acoustically connected) to outside of the device while the back side is ported to a back tuning volume. As a result, positioning of the micro-speaker in the device may be limited. For example, placement on a reverse side of a printed circuit board of the personal electronic device may be precluded. It may also be difficult to seal the back tuning volume, which may result in weaker bass output and higher distortion. In addition, user dissatisfaction may result if higher volume signals port high acoustic levels too close to a user's ear.

For audio performance, it is known to use a speaker having relatively uniform frequency characteristics in the 300 hertz (Hz) to 3400 Hz voice frequency band. Where music or other complex signals are provided by the device, a speaker with a frequency range providing a bandwidth up to at least about 8000 Hz may be used. In addition, louder alert signals may be provided in various personal electronic devices.

SUMMARY OF THE INVENTION

Embodiments of the present invention provide micro-speaker assemblies and mobile terminals including micro-speaker assemblies. The micro-speaker assembly includes a micro-speaker positioned in a housing. A low frequency back tuning volume is adjacent a front face of the micro-speaker and a high frequency forward tuning volume is adjacent a back face of the micro-speaker. A passageway extends from the forward tuning volume to an opening in the housing. The back tuning volume may be closed.

In further embodiments of the present invention, the mobile terminal includes an antenna board positioned in the housing that defines a wall of the back tuning volume and a printed circuit board. The antenna board may be electrically coupled to the printed circuit board and positioned at a selected distance from the printed circuit board to provide a desired frequency response. The back tuning volume may be positioned between the printed circuit board and the antenna board. The micro-speaker may be electrically coupled to the printed circuit board and positioned between the printed circuit board and the antenna board. The antenna board in some embodiments includes a passage extending from the back tuning volume configured to compensate the back tuning volume for changes in atmospheric pressure.

In other embodiments of the present invention, the antenna board is substantially parallel to the printed circuit board and the mobile terminal further includes a mounting member positioned between the printed circuit board and the antenna board that defines sidewalls and a front wall of the back tuning volume. The antenna board defines a back wall of the back tuning volume. A seal may be provided between the antenna board and the mounting member that closes the back tuning volume. The seal may be an adhesive, such as a sticky tape. The antenna board may be positioned adjacent a back side of the printed circuit board and a keypad and/or a display may be positioned on a front side of the printed circuit board. The back face of the micro-speaker may be electrically coupled to the back side of the printed circuit board. Spring connectors on the back side of the printed circuit board may be provided to electrically couple the micro-speaker to the back side of the printed circuit board.

In further embodiments of the present invention, the opening is in a side of the housing. The mobile terminal may include a receiver speaker coupled to the front side of the printed circuit board that has an opening in a front face of the housing. The back tuning volume may have a volume selected to provide a desired amplitude response in a bass frequency range from about 300 hertz (Hz) to about 900 Hz.

In other embodiments of the present invention, the mobile terminal includes a grommet positioned in the housing. The micro-speaker is positioned in the grommet and the grommet is configured to provide a seal between the front and back faces of the micro-speaker. The grommet may define a first forward tuning volume adjacent the back face of the micro-speaker. The grommet may also define the passageway and a second forward tuning volume adjacent the opening. The second forward tuning volume may extend along the side of the housing past the opening. The grommet may also include a stiffener wall positioned between sides of the opening.

In further embodiments of the present invention, a second forward tuning volume is provided in fluid communication with the passageway and positioned at a location between the first forward tuning volume and the opening in the housing. The second forward tuning volume, the first forward tuning volume and the passageway define a double-resonator that tunes a frequency response of the micro-speaker. The frequency response of the micro-speaker may be tuned to provide an amplitude response in a voice frequency range and a high amplitude response, greater than the response in the voice frequency range, at an alert frequency. The minimum amplitude response in the voice frequency range may be at least about −20 decibels (dB) and the alert frequency may be between about 3000 Hz and about 4000 Hz. The minimum amplitude response in the voice frequency range may be at least about −10 decibels (dB).

In other embodiments of the present invention, the frequency response of the micro-speaker is tuned to provide an amplitude response in an extended frequency range above the voice frequency range. The amplitude response in the extended frequency range may be at least about −20 decibels (dB) and the extended frequency range may be up to at least about 8000 hertz (Hz). The alert frequency may be a first resonance frequency of the double-resonator greater than about 3000 hertz (Hz) and a second resonance frequency of the double-resonator, greater than the first resonance frequency, may be selected to provide an extended frequency range above the voice frequency range. The second resonance frequency may be between about 6000 hertz (Hz) and about 8000 hertz (Hz).

In further embodiments of the present invention, the opening has an area of less than about 10 square millimeters (mm$^2$). The micro-speaker may have a diameter of between about 10 millimeters (mm) and about 20 mm. The micro-speaker may have a bandwidth of at least about 8000 hertz (Hz). The micro-speaker in other embodiments has a bandwidth of at least about 10000 hertz (Hz). The frequency response of the micro-speaker may be tuned to provide a minimum amplitude response of about −20 decibels (dB) up to about 8000 hertz (Hz) and a high amplitude response, greater than the minimum amplitude response, at an alert frequency between about 3000 hertz (Hz) and about 4000 Hz.

In other embodiments of the present invention, the mobile terminal includes a receiver that receives voice signals from a wireless communications network and a controller that decodes the voice signals and provides the decoded voice signals to the micro-speaker.

DETAILED DESCRIPTION

Figure 1:
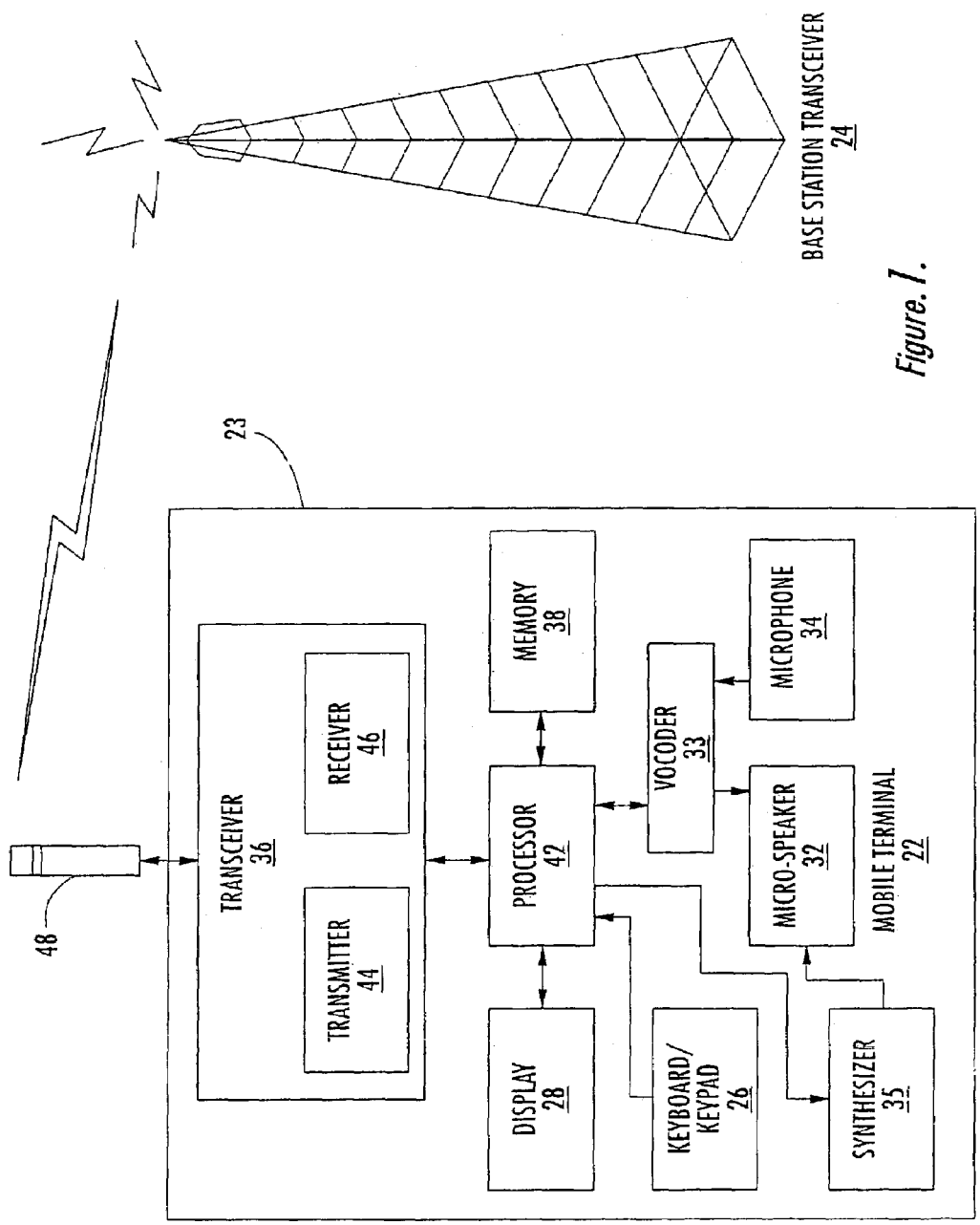
FIG. 1 is a schematic block diagram illustrating a mobile terminal including a tuned micro-speaker assembly according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is described below with reference to block diagrams of methods and mobile terminals or micro-speaker assemblies according to embodiments of the invention. Embodiments of the present invention will now be described with reference to the schematic block diagram illustration of a mobile terminal in FIG. 1. FIG. 1 illustrates an exemplary radiotelephone communication system, in accordance with embodiments of the present invention, which includes mobile terminal 22 and a base station transceiver 24 of a wireless communications network. The mobile terminal 22 includes a portable housing 23 and may include a keyboard/keypad 26, a display 28, a micro-speaker assembly 32, a microphone 34, a transceiver 36, and a memory 38 that communicate with a controller/processor 42. The transceiver 36 typically comprises a transmitter circuit 44 and a receiver circuit 46, which respectively transmit outgoing radio frequency signals to the base station transceiver 24 and receive incoming radio frequency signals, such as voice signals, from the base station transceiver 24 via an antenna 48. The radio frequency signals transmitted between the mobile terminal 22 and the base station transceiver 24 may comprise both traffic and control signals (e.g., paging signals/messages for incoming calls), which are used to establish and maintain communication with another party or destination. The controller/processor 42 may support various functions of the mobile terminal 22, including decoding received voice signals from the receiver circuit 42 and providing the decoded voice signals to the micro-speaker assembly 32. As shown in FIG. 1, musical instrument digital interface (MIDI) signals may be supplied to the micro-speaker 32 by a MIDI synthesizer 35 for alerting and/or user feedback. Alternatively, synthesizers for other formats may be provided.

The foregoing components of the mobile terminal 22, other than the micro-speaker assembly 32, may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer, that may include a radiotelephone transceiver, or other portable device using a micro-speaker in a space constrained housing configuration.

In some embodiments of the present invention, the base station transceiver 24 comprises the radio transceiver(s) that define an individual cell in a cellular network and communicate with the mobile terminal 22 and other mobile terminals in the cell using a radio-link protocol. Although only a single base station transceiver 24 is shown, it will be understood that many base station transceivers may be connected through, for example, a mobile switching center and other devices to define a wireless communications network.

Although the present invention may be embodied in communication devices or systems, such as the mobile terminal 22, the present invention is not limited to such devices and/or systems. Instead, the present invention may be embodied in any apparatus that utilizes a tuned micro-speaker.

Figure 2:
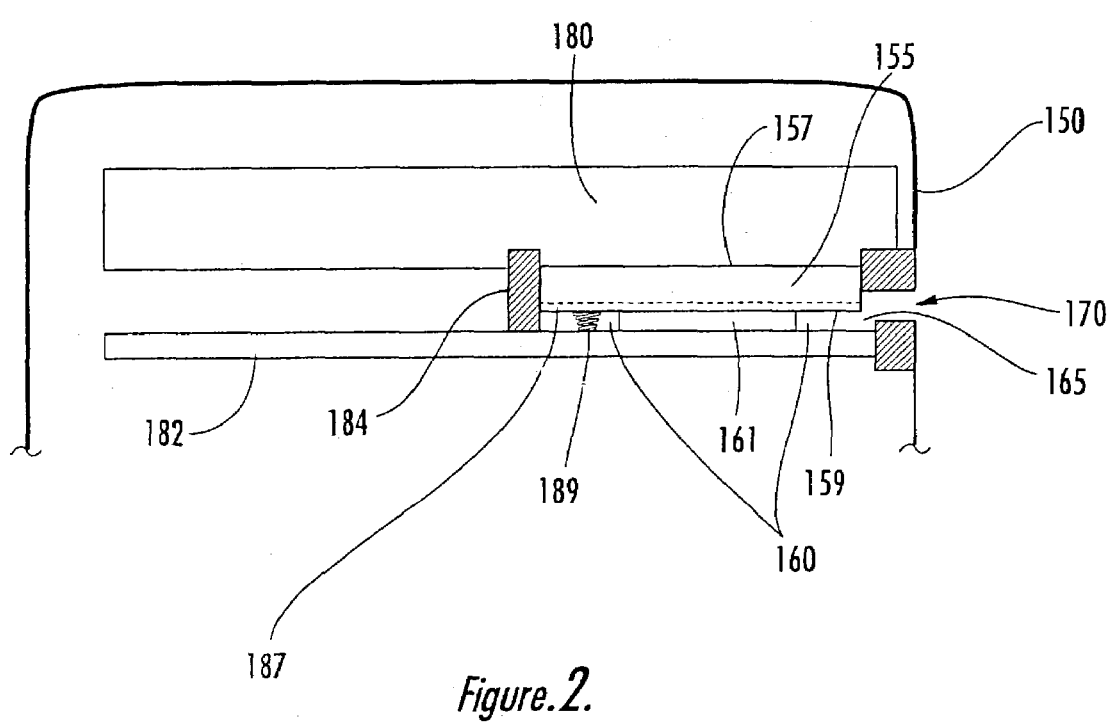
FIG. 2 is a schematic cross-section illustrating a reverse mounted micro-speaker assembly according to some embodiments of the present invention.

A tuned micro-speaker assembly according to embodiments of the present invention will now be further described with reference to the schematic block diagram illustration of FIG. 2. As shown in the embodiments of FIG. 2, the micro-speaker assembly 132 includes a micro-speaker 155 positioned in a housing 150. Only a portion of the housing 150 is shown in FIG. 2 and the housing 150 may include other components that are not directly related to the micro-speaker assembly. The micro-speaker 155 includes a front face 157 and a back face 159 positioned opposite from the front face 157. The back face 159 is on the side of the micro-speaker 155 facing the coil/magnet 161. A cloth filter 187 is positioned on the back face 159 that provides debris filtration. A first high frequency forward tuning volume 160 is located adjacent the back face 159 of the micro-speaker 155. A passageway 165 extends from the first forward tuning volume 160 to an opening 170 in the housing 150.

As further illustrated in FIG. 2, the micro-speaker assembly includes a low frequency back tuning volume 180, which is located adjacent the front face 157 of the micro-speaker 155. The back tuning volume 180 may be acoustically closed. While the relative volumes of the respective tuning volumes 160, 180 are merely illustrative and not intended to limit the present invention, in various embodiments of the present invention, the back tuning volume 180 is at least an order of magnitude larger than the forward tuning volume 160.

The micro-speaker assembly 132 may be used as the micro-speaker assembly 32 in a mobile terminal 22 such as illustrated in FIG. 1. In such a case, the portable housing 23 of the mobile terminal 22 may serve as the housing 150 of the micro-speaker assembly 132. It is to be further understood that, while the illustration of FIG. 2 shows a side opening 170 for a micro-speaker assembly 132, the invention is not limited to such a porting and may also be ported to the top of the mobile terminal 22 or other location, for example, to avoid peak acoustic exposure to high sound levels at an earpiece position of the mobile terminal 22 without having an unacceptable impact on the frequency response of the micro-speaker 155. In further embodiments, it will be understood that the micro-speaker 155 may be ported through or integrated into other hardware of the mobile terminal 22, as well as the configuration illustrated in FIG. 2, without significant degradation of the audio performance of the micro-speaker assemble 132.

As shown in the embodiments of FIG. 2, the micro-speaker 155 is electrically coupled to a printed circuit board 182. As shown in the embodiments of FIG. 2, the electrical connection is provided by spring connectors/contacts 189.

In the embodiments illustrated in FIG. 2, the micro-speaker 155 is positioned in a grommet 184. The grommet 184 is configured to provide a seal between the front face 157 and the back face 159 of the micro-speaker 155. The grommet also defines the forward tuning volume 160 adjacent the back face 159 and the passageway 165.

Micro-speaker 155, in various embodiments of the present invention, has a diameter of between about 10 millimeters (mm) and about 20 mm. In other embodiments, the opening 170 may have an area of less than about 10 square millimeters (mm$^2$). Such a small port size may be about half the size, or less, of typical existing porting strategies for micro-speakers. The use of such smaller porting size openings for the opening 170 may, for example, be desirable to reduce interference or detraction from the appearance of the mobile terminal 22 or other device in which the micro-speaker assembly 132 is located.

Figure 3:
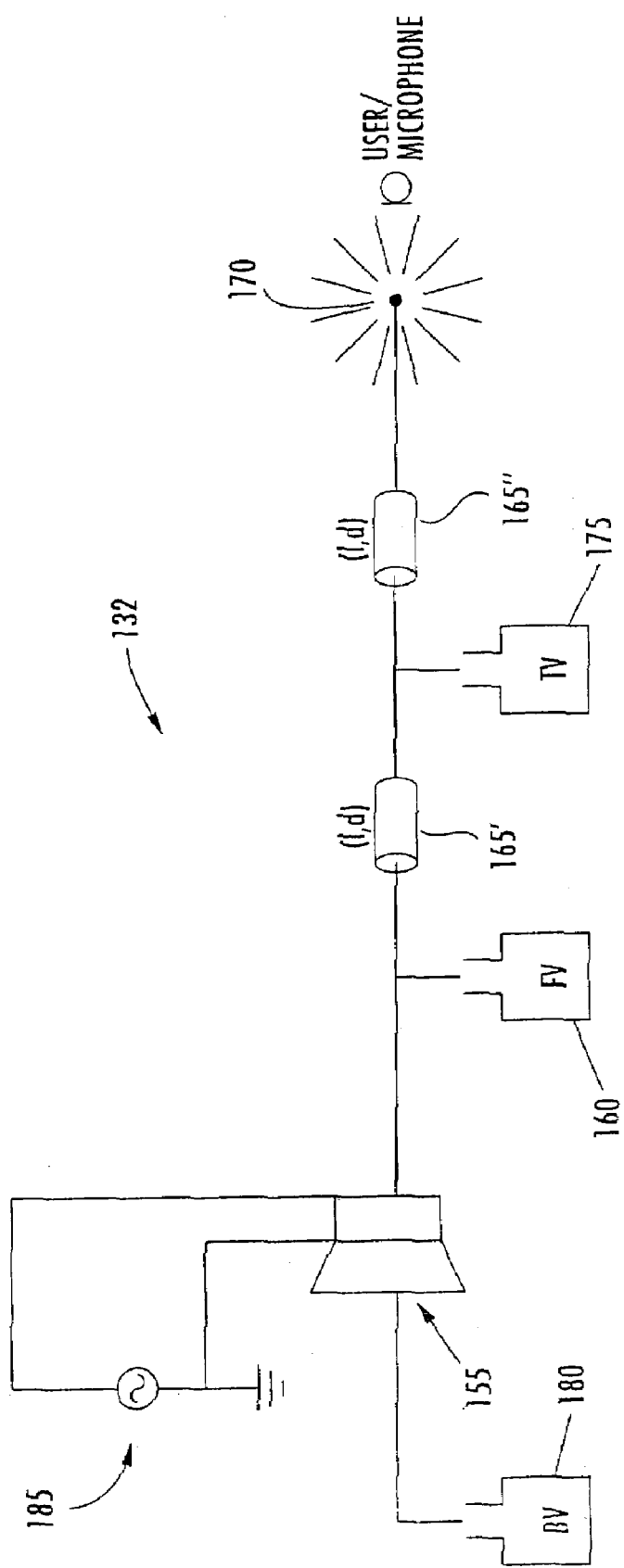
FIG. 3 is a schematic diagram illustrating a mechanical to acoustical analogy model of a tuned micro-speaker according to some embodiments of the present invention.

FIG. 3 is a schematic diagram illustrating a mechanical to acoustical analogy model for the tuned micro-speaker assembly illustrated in FIG. 2. For the embodiments illustrated in FIG. 3, two high frequency forward tuning volumes are utilized to define a double-resonator that tunes a frequency response of the micro-speaker 155. In FIG. 3, volumes of the tuning volumes are represented as compliance FV for the first forward tuning volume 160, TV for a second forward tuning volume 175, and BV for the back tuning volume 180. Furthermore, the passageway 165 includes a first section 165' extending from the first forward tuning volume 160 to the second forward tuning volume 175 and a second section 165" extending from the second forward tuning volume 175 to the opening 170 in the housing 150. The signal from the speaker 155 radiates from the opening 170 into the air to be received by a user or a microphone or other hearing device. As shown in FIG. 3, each of the passageway segments 165', 165" is characterized by a length (l) and a diameter (d).

Also shown in FIG. 3 is a frequency generator 185. The frequency generator 185, or other signal source, provides a voltage (and/or current) driving signal to the micro-speaker 155.

As seen in FIG. 3, the effect of having two front tuning volumes 160, 175 and the passageway 165', 165", provides a double-resonator for the micro-speaker assembly 132 which, as will be described further herein, in some embodiments may be used to provide both good alerting performance and extend the frequency response of the micro-speaker assembly 132 above the voice frequency range.

Figure 4:
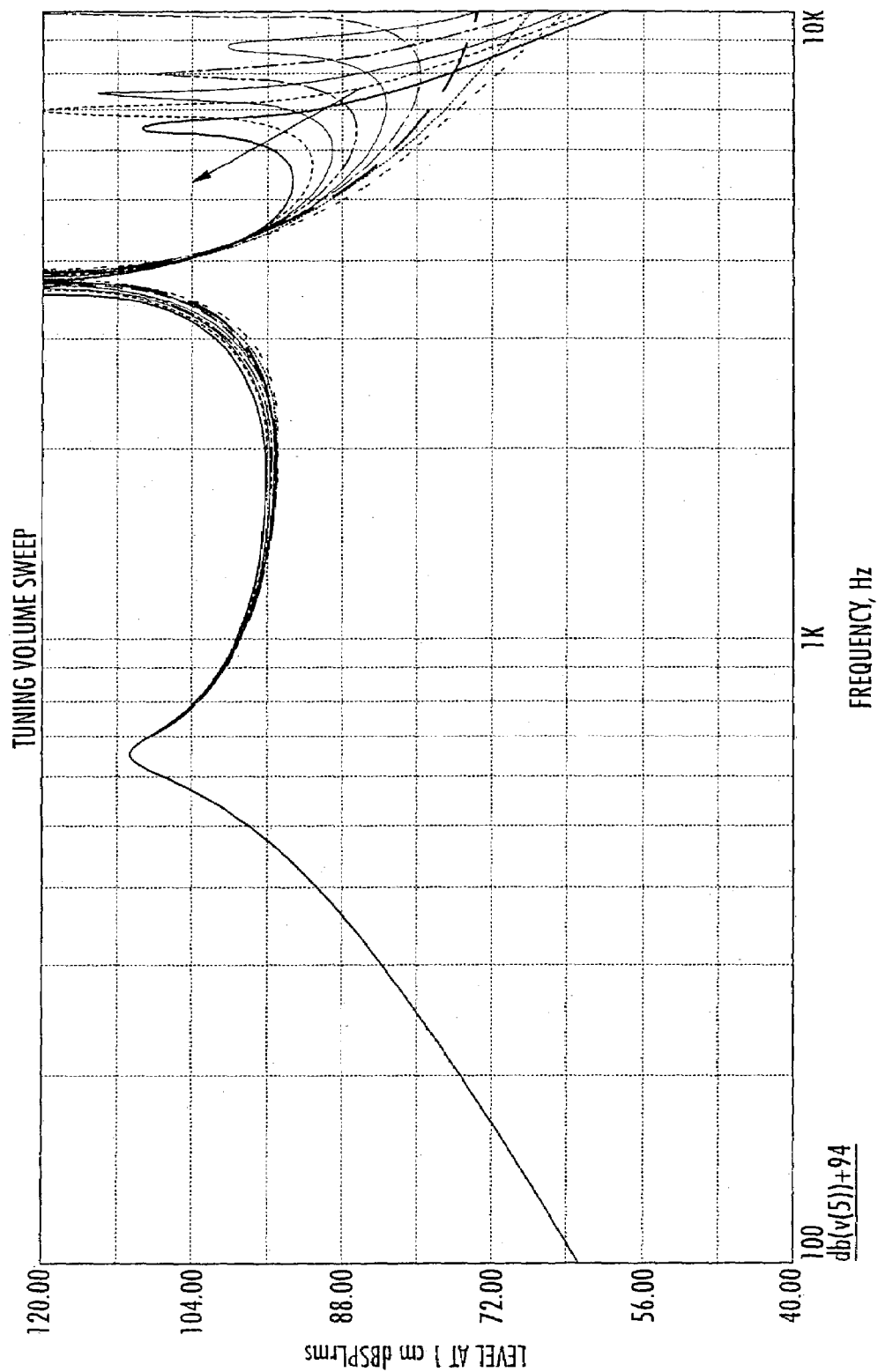
FIG. 4 is a semi-logarithmic graph illustrating predicted frequency response through an extended frequency range for micro-speaker assemblies according to some embodiments of the present invention with different second tuning volume configurations.
Figure 5:
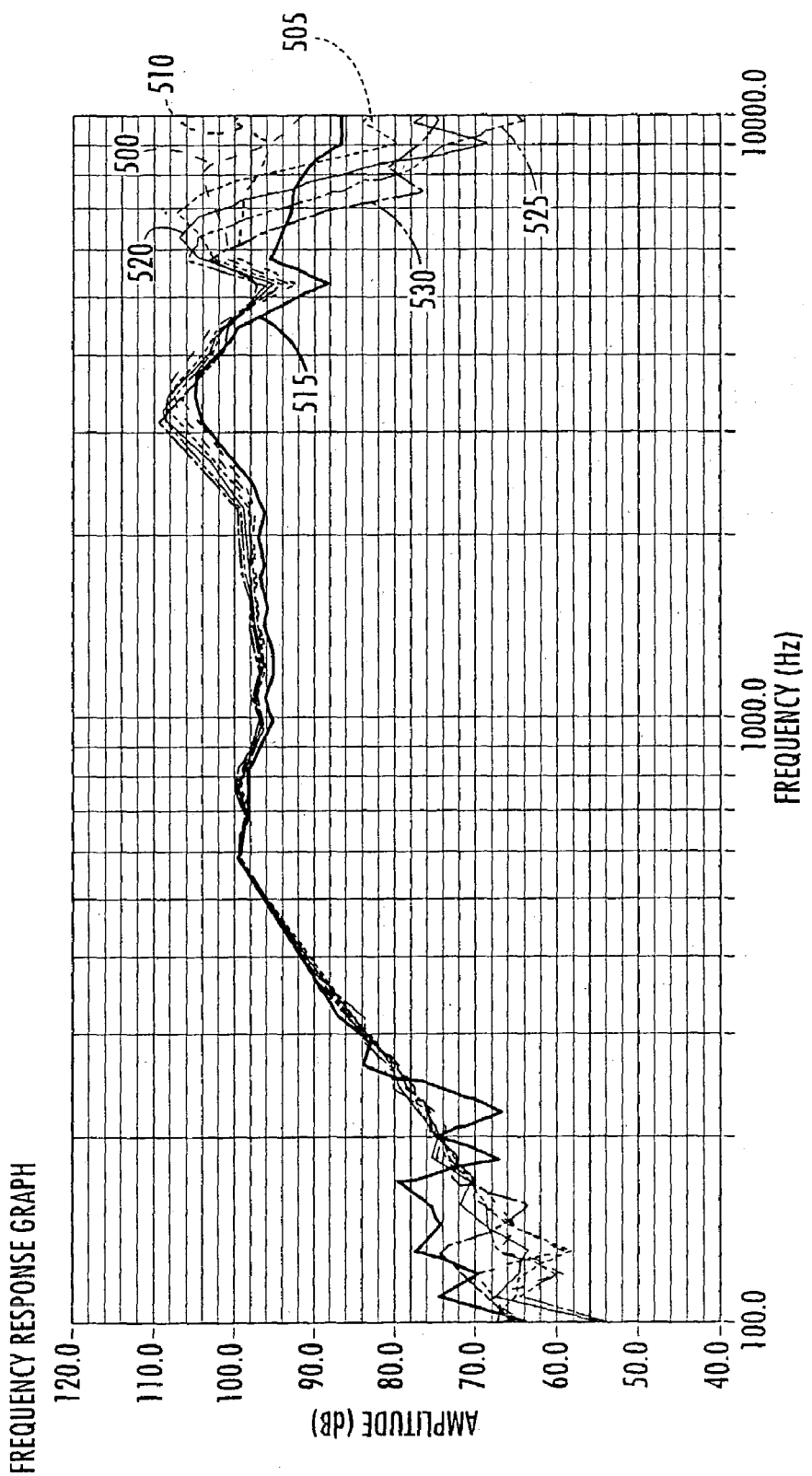
FIG. 5 is a semi-logarithmic graph illustrating frequency response through an extended frequency range for micro-speaker assemblies according to some embodiments of the present invention with different second tuning volume configurations.
Figure 6:
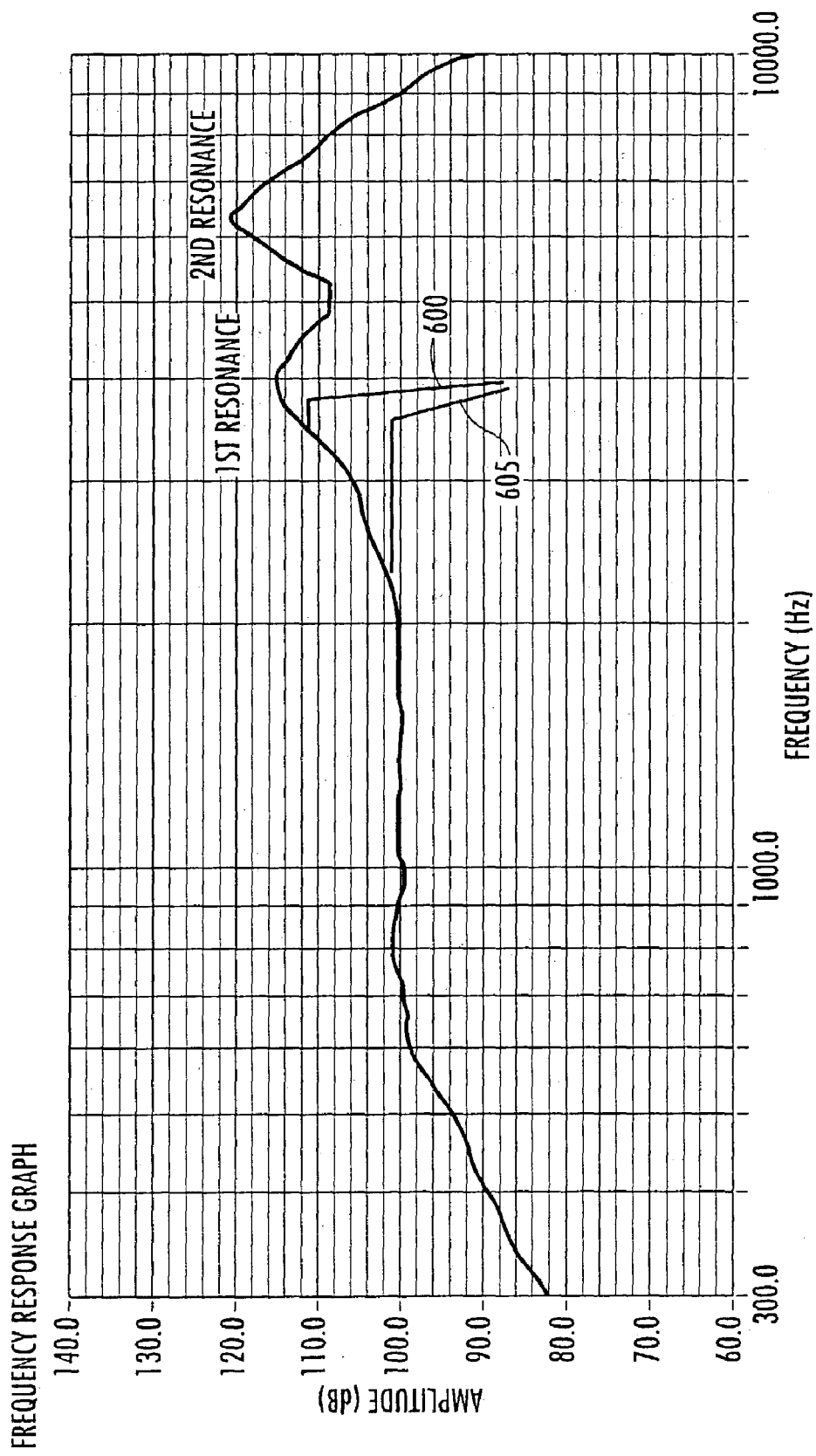
FIG. 6 is a semi-logarithmic graph illustrating frequency response through an extended frequency range for a micro-speaker assembly according to some embodiments of the present invention.

FIGS. 4-6 are semi-logarithmic graphic illustrations of frequency response for tuned micro-speaker assemblies according to various embodiments of the present invention. More particularly, FIGS. 4 and 5 illustrate the effect of increasing or decreasing the size of the second forward tuning volume 175 on the frequency response of the micro-speaker 155. FIG. 4 illustrates the predicted response of the micro-speaker 155 based on a mathematical model of the micro-speaker assembly 132 as illustrated in FIG. 3. The arrow shown in FIG. 4 in the extended frequency range above the first resonant frequency shows the trends of the curve in the extended frequency range with increasing volume of the second forward tuning volume 175. Thus, increased volume of the second forward tuning volume 175 can be seen to lower the amplitude of the second (or higher) frequency resonance point while increasing the amplitude in the extended frequency range above approximately 4000 hertz (Hz). More particularly, the amplitude output illustrated in the graph of FIG. 4 corresponds to a level measured in decibels sound pressure level root mean square (referenced to 20 microPascals) (dBSPL$_{rms}$) at 1 centimeter (cm) from the opening 170 of the micro-speaker assembly 132 when the frequency generator 185 sweeps through the frequency band providing a 1 volt$_{rms}$ input to the micro-speaker 155. The micro-speaker utilized to generate the results shown in FIG. 4 is an 8 ohm, 15 millimeter diameter micro-speaker.

FIG. 5 is a semi-logarithmic graph illustrating test data of measurements from micro-speaker assembly 132 in accordance with the mechanical model illustrated in FIG. 3 used to demonstrate the effect of micro-speaker tuning in accordance with various embodiments of the present invention. For the embodiments illustrated in FIG. 5, the back tuning volume 180 is 2.5 cubic centimeters, the first forward tuning volume 160 is 0.18 cubic centimeters and the second forward tuning volume 175 is 0.15 cubic centimeters. The opening 170 is 2.65 millimeter square (or equivalently, a 3 millimeter diameter providing substantially the same opening area where the passageway is a tube). For the results illustrated in FIG. 5, the second forward tuning volume 175 is positioned adjacent a wall 152 defining the housing 150 resulting in a second passageway section 165" having a length of 1.5 millimeters, corresponding to the thickness of a typical plastic mobile terminal wall. The first passageway section 165' has a length of 3.5 millimeters. Again, performance for different volumes of the second forward tuning volume 175 (up through 0.3 cubic centimeters) are shown by the various curves in FIG. 5. In particular, the illustrated response curves correspond to a second forward tuning volume of 100 cubic millimeters ($mm^3$) 500, 150 $mm^3$ 505, 50 $mm^3$ 510, 0 $mm^3$ 515, 200 $mm^3$ 520, 250 $mm^3$ 525 and 300 $mm^3$ 530.

As shown in FIG. 4, by increasing the 2nd forward volume (front tuning volume) a relatively steep low-pass filter response may be provided by the second resonance, starting between about 6000 Hz and about 8000 Hz, which may provide a significant attenuation of the signal output from about 8000 Hz to about the typical human hearing limit of approximately 20 kHz. For midi synthesizers where it is desired to only support a frequency bandwidth to about 8000 Hz, this acoustic low-pass filter can be used to remove noise in the signal path to the microspeaker (such as digital to analog converter noise). In FIG. 5, curve 525 illustrates an example low-pass filter slope that might be provided by embodiments of the present invention, which provides as much as about a 30 dB reduction of output at 10000 Hz as compared to 1000 Hz.

The performance of a particular selected design of a micro-speaker assembly in accordance with embodiments of the present invention is further illustrated in the semi-logarithmic graph of FIG. 6. As shown in FIG. 6, second resonance frequency for the dual-resonator is between 6000 hertz (Hz) and 7000 hertz. The first resonance falls at an alert frequency at or just below 4000 hertz. The amplitude lift provided by the second resonance substantially nearly doubles the bandwidth of the micro-speaker assembly above the voice frequency range of about 300 hertz to about 3400 hertz, providing a bandwidth to the system of about 10,000 hertz. Such an extend frequency response may support, for example, polyphonic ring tone and melodies (such as from a MIDI synthesizer or MP3 file playback or the like). The placement of the first resonance at about 4000 hertz is selected to provide a high amplitude alerting performance from about 3000 hertz to about 4000 hertz (and up to even about 8000 hertz for harmonics of the alerting ring frequency). While the scale has been changed for the amplitude displayed in FIG. 6 as compared to FIGS. 3-5, as illustrated in FIG. 6, a one $V_{rms}$ input to the micro-speaker yields a 115 $dBSPL_{rms}$ at resonance, a performance comparable with typical high quality buzzers in portable devices.

With the performance for the system as illustrated in FIG. 6, in processing voice signals, such as in a speaker phone mode for a mobile terminal, as the first resonance is at about 4000 hertz instead of 3000 hertz, the effect of a low pass filter, such as may typically be found in the coder/decoder (codec) of a mobile terminal (shown by the curve 600 in FIG. 6), starts to attenuate below the resonance frequency, utilizing this effect to shape the curve. If a smoother curve is desired, a finite impulse response (FIR) filter could be utilized, as shown by the curve 605 in FIG. 6, to provide fine tuning to the frequency response of the micro-speaker assembly. Also note that, while FIG. 6 does not illustrate the effective changes in the tuning volume of the second forward tuning volume 175, as shown in FIG. 4, the dependence on such tuning volume of the first resonance is expected to be small. Thus, the first resonance could readily be moved to lower frequencies, for example, by increasing the volume of the first forward tuning volume 160 to lower the first resonance frequency.

As illustrated by the discussion of the present invention above, micro-speakers in accordance with various embodiments of the present invention may support high alerting ring levels while maintaining adequate level frequency response for speaker phone mode in the voice frequency range as well as extending frequency response bandwidth for polyphonic melodies (MIDI, MP3, etc.). Such a frequency response may be provided without requiring the use of a large opening size from the housing of the micro-speaker assembly and, further, while allowing peak acoustic concerns in mobile terminal design to be addressed through porting of the speaker to the top or side of the mobile terminal instead of an earpiece. Furthermore, the porting of the micro-speaker may, in various embodiments, be provided through the main antenna or other features of the mobile terminal such as a printed circuit board (PCB) of the mobile terminal.

As shown by the frequency response curves of FIGS. 4-6, in various embodiments of the present invention, the micro-speaker 155 is tuned to provide an amplitude response in the voice frequency range and a high amplitude response, greater than the response at the voice frequency range, at an alert frequency. The amplitude response in the voice frequency range may be at least about −20 decibels (dB) or, in further embodiments, at least about −10 dB, when measured at about one centimeter (cm). The alert frequency may be between about 3000 hertz and about 4000 hertz as shown by the approximately 4000 hertz first resonance for the alert frequency in FIG. 6. An amplitude response is also provided, through the use of the double-resonator, in an extended frequency range above the voice frequency range, such as to at least about 8000 hertz or, as shown in FIG. 6, to at least about 10,000 hertz. The minimum amplitude response in the extended frequency range, as in the voice frequency range, may be about −20 dB. The second resonance frequency may be between about 6000 hertz and about 8000 hertz. Thus, in various embodiments, the micro-speaker may be provided a bandwidth of at least about 8000 hertz and, in further embodiments, a bandwidth of at least about 10,000 hertz. The double-resonator provided by the micro-speaker assembly of the present invention may extend the frequency response of the micro-speaker above the voice frequency range and provide loud alert frequency signals. In some embodiments of the present invention, the back tuning volume has a volume selected to provide a desired amplitude response in a bass frequency range from about 300 hertz (Hz) to about 900 Hz. The size of the back tuning volume may be as large as practicable as adding back volume generally improves low frequency response. In particular embodiments of the present invention, a minimum design requirement of 2 cubic centimeters back volume is applied.

Figure 7:
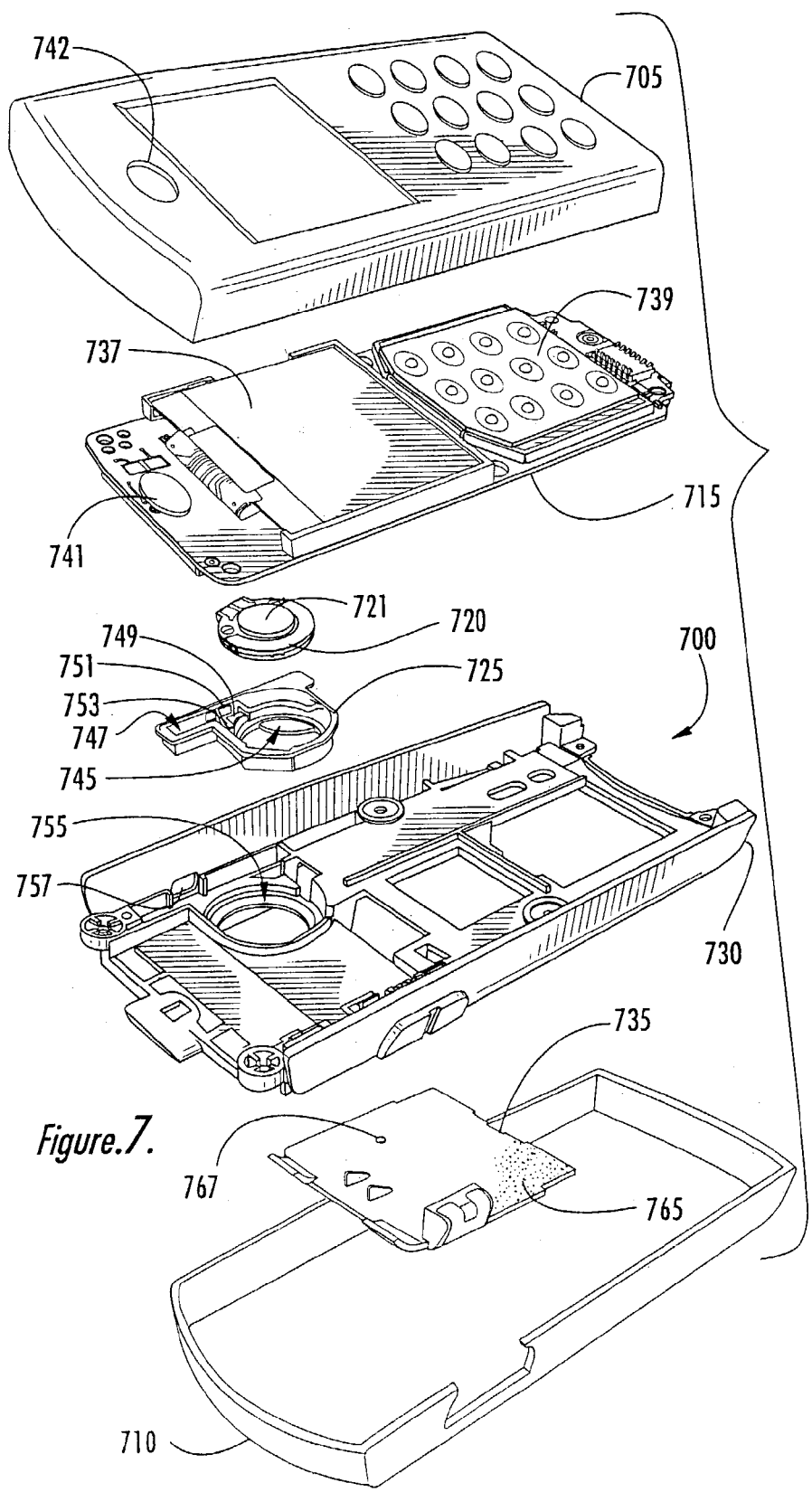
FIG. 7 is an exploded perspective view of a mobile terminal including a micro-speaker assembly according to some embodiments of the present invention.
Figure 8:
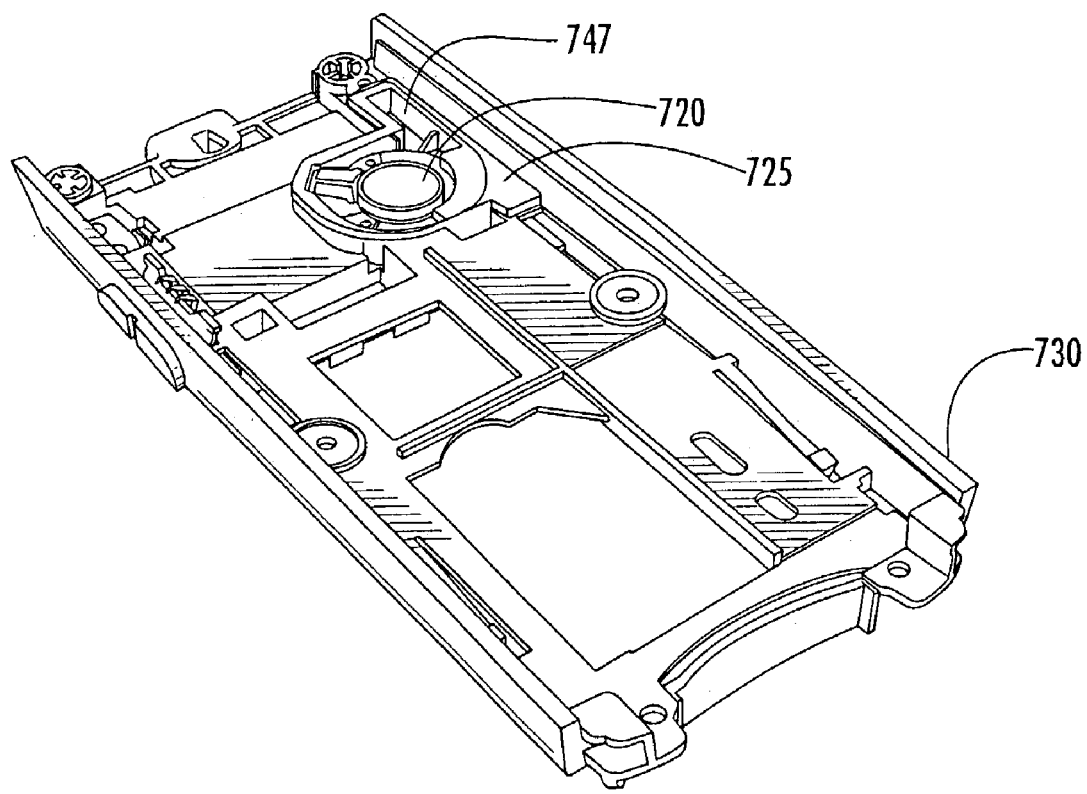
FIGS. 8-10 are perspective views of the mobile terminal of FIG. 7.

Further embodiments of the present invention will now be described with reference to FIGS. 7-10. FIG. 7 is an exploded perspective view of a mobile terminal 700 including a micro-speaker assembly according to various embodiments of the present invention. As illustrated in FIG. 7, the mobile terminal 700 includes a front cover 705 and a back cover 710 that mate with the mounting member 730 to define a portable housing of the mobile terminal 700. A printed circuit board 715, a micro-speaker 720, a grommet 725 and an antenna board 735 are positioned in the housing.

The printed circuit board 715 includes user input/output devices such as a display 737 and a keyboard or keypad 739 on the front side of the printed circuit board 715. As shown in the embodiments of FIG. 7, a receiver speaker 741 is also electrically coupled to the printed circuit board 715 for use in outputting audio signals, for example, during a voice conversation between the mobile terminal 700 and another communication device. An opening 742 in the front cover 705 is positioned adjacent the receiver speaker 741 provide an ear piece for a user of the mobile terminal 700.

Figure 10:
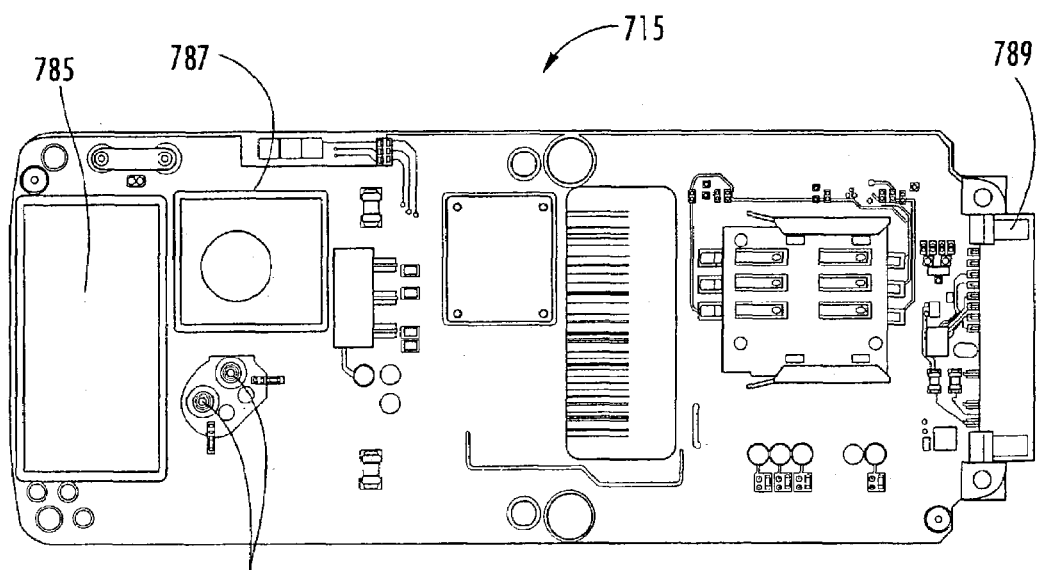

As shown in FIG. 10, the printed circuit board 715 includes various components associated with the backside of the printed circuit board 715. A receiver 785 that receives voice signals from a wireless communications network is illustrated mounted on the backside of the printed circuit board 715. A controller 787 decodes the voice signals and provides the decoded voice signals to the micro-speaker 720 and/or the receiver speaker 741. A system connector 789 on the printed circuit board 715 extends through the housing of the mobile terminal 700 to allow access to the circuitry on the printed circuit board 715, for example, for use by an auxiliary component coupled to the system connector 789. In addition, spring connectors or contacts 791 on the backside of the printed circuit board 715 electrically couple the micro-speaker 720 to the backside of the printed circuit board 715.

Referring again to FIG. 7, the grommet 725 is configured to receive the micro-speaker 720 and provide a seal between the front 777 and back 721 faces of the micro-speaker 720. The back face 721 is visible in FIG. 7 oriented towards the backside of the printed circuit board 715.

For the embodiments illustrated in FIG. 7, the grommet 725 further defines a first forward tuning volume 745 adjacent the back face of the micro-speaker 720 and a passage 749 acoustically coupling the first forward tuning volume 745 to an opening 753 in the grommet. The opening 753 aligns with the opening 757 in of the mounting member 730.

For the illustrated double resonant embodiments of the present invention, the grommet 725 further defines a second forward tuning volume 747 adjacent the opening 753 and extending along a side of the mounting member 730. A stiffener wall 753 is positioned in the grommet 725 between sides of the opening 751 approximate a midpoint of the opening 751. The second forward tuning volume 747 is in fluid communication with the passageway 749 and positioned between the first forward tuning volume 745 and the opening 753. The second forward tuning volume 747, the first forward tuning volume 745 and the passageway 749 define a double resonator that tunes a frequency response of the micro-speaker 720. As was described above, with reference to FIGS. 3-6, the frequency response of the micro-speaker 720 may be tuned to provide an amplitude response in a voice frequency range and a high amplitude response, greater than the response of the voice frequency range, at an alert frequency. It may further be tuned to provide an amplitude response in an extended frequency range above the voice frequency range, for example, to support musical sounds.

Figure 9:
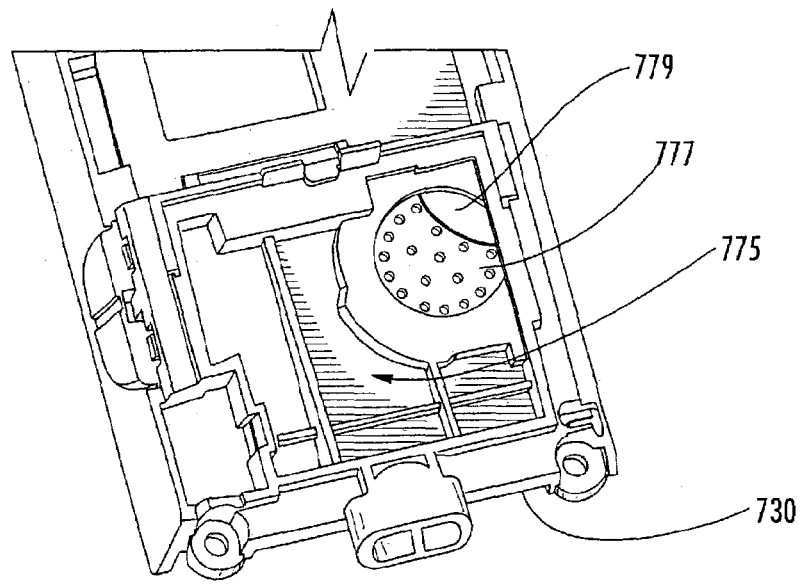

As also shown in the embodiments of FIG. 7, the antenna board 735, which is electrically coupled to the printed circuit board 715, is positioned at a selected distance from the printed circuit board 715, when the mobile terminal 700 is assembled, to provide a desired frequency response for the antenna board 735. The micro-speaker 720 is positioned between the printed circuit board 715 and the antenna board 735. The antenna board 735 includes an adhesive, such as the sticky tape 765 that, as will be described further with reference to FIG. 9, provides a seal between the antenna board 735 and walls of the mounting member 730 to define an acoustically closed high frequency back tuning volume. However, other seal means may be used in various embodiments of the present invention.

The antenna board 735 may be substantially parallel to the printed circuit board 715. As shown in the embodiments of FIG. 7, the antenna board 735 further includes a passage 767 extending from the back tuning volume to external atmosphere that is configured to compensate the back tuning volume for changes in atmospheric pressure, for example, when the mobile terminal 700 is taken to high altitude locations.

Referring now to FIG. 9, various features of the backside mounting member 730 will be further described. As shown in FIG. 9, the mounting member 730 defines, in cooperation with the antenna board 735, the back tuning volume 775. The front face 777 of the micro-speaker 720 is visible in the back tuning volume 775 as shown in FIG. 9 because the antenna board 735 is not shown in FIG. 9. A retaining flap 779 is shown that helps retain the micro-speaker 720 in the mounting member 730. The retaining flap 779 may be part of the grommet 725 or may be a feature of the mounting member 730.

The mounting member 730 may be an insulating material such as Cycoloy® available from GE Plastics. The grommet 725 may also be an insulating material and maybe a more compliant material such as silicon rubber to facilitate sealable engagement of the micro-speaker 720 in the grommet 725 and to facilitate placement of the grommet 725 into a mating receptacle 755 in the mounting member 730 (FIG. 7). Furthermore, while various electronic circuits, such as the receiver 785 and controller 787 are shown as mounted on specific faces of the printed circuit board 715, it is to be understood that they may be positioned on different sides of the printed circuit board 715 in various embodiments of the present invention.

As is clear from the description above, embodiments of the present invention provide for placement of a micro-speaker in a reverse orientation mechanically and acoustically wherein the front face of the micro-speaker is connected to a back volume that is an acoustically closed volume provided generally for improved bass (low frequency) performance and the rear (back) face of the micro-speaker is associated with forward tuning volume(s) ported to free air. Such an orientation may allow for more simple connection of the micro-speaker to contacts, such as spring contacts, on a printed circuit board associated with the micro-speaker assembly and may allow positioning of the micro-speaker on the backside of the printed circuit board. As micro-speakers often are provided with filters, such as cloth filters on the back face of the micro-speaker, venting of the back face, rather than the front face of the micro-speaker may reduce the need for additional filtration compensation from debris. Various embodiments of the present invention further provide for flexibility in porting of the micro-speaker, such as to the side of the mobile terminal's housing, which may provide for high amplitude generation from a polyphonic speaker for entertainment purposes while limiting the acoustic levels ported to a user's earpiece. The reverse orientation may further facilitate sealing of the back tuning volume associated with the micro-speaker, which in turn may provide improved bass output and lower distortion audio signals. Furthermore, the reverse mounted orientation of the present invention may provide for reduced volume requirements in the housing of the mobile terminal 700 as such mounting facilitates sharing of a portion of the air volume inside of the mobile terminal 700 by the antenna board 735 and the back volume 775.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A mobile terminal, comprising:
   a portable housing;
   a micro-speaker positioned in the housing;
   a low frequency back tuning volume adjacent a front face of the micro-speaker;
   a high frequency forward tuning volume adjacent a back face of the micro-speaker;
   a passageway extending from the forward tuning volume to an opening in the housing.

2. The mobile terminal of claim 1 further comprising an antenna board positioned in the housing that defines a wall of the back tuning volume.

3. The mobile terminal of claim 2 further comprising a printed circuit board in the housing and wherein the antenna board is electrically coupled to the printed circuit board and positioned at a selected distance from the printed circuit board to provide a desired frequency response and wherein the back tuning volume is positioned between the printed circuit board and the antenna board.

4. A mobile terminal, comprising:
   a portable housing;
   a micro-speaker positioned in the housing;
   a low frequency back tuning volume adjacent a front face of the micro-speaker;
   a high frequency forward tuning volume adjacent a back face of the micro-speaker;
   a passageway extending from the forward tuning volume to an opening in the housing;
   an antenna board positioned in the housing that defines a wall of the back tuning volume; and
   a printed circuit board in the housing,
   wherein the antenna board is electrically coupled to the printed circuit board and positioned at a selected distance from the printed circuit board to provide a desired frequency response,
   wherein the back tuning volume is positioned between the printed circuit board and the antenna board, and
   wherein the micro-speaker is electrically coupled to the printed circuit board and positioned between the printed circuit board and the antenna board.

5. The mobile terminal of claim 4 wherein wherein the back tuning volume is a closed tuning volume and wherein the antenna board includes a passage extending from the back tuning volume configured to compensate the back tuning volume for changes in atmospheric pressure.

6. The mobile terminal of claim 5 wherein the antenna board is substantially parallel to the printed circuit board and wherein the mobile terminal further comprises a mounting member positioned between the printed circuit board and the antenna board that defines sidewalls and a front wall of the back tuning volume and wherein the antenna board defines a back wall of the back tuning volume.

7. The mobile terminal of claim 6 further comprising a seal between the antenna board and the mounting member that closes the back tuning volume.

8. The mobile terminal of claim 7 wherein the seal comprises an adhesive.

9. The mobile terminal of claim 8 wherein the antenna board is positioned adjacent a back side of the printed circuit board and wherein a keypad and/or a display are positioned on a front side of the printed circuit board and wherein the back face of the micro-speaker is electrically coupled to the back side of the printed circuit board.

10. The mobile terminal of claim 9 further comprising spring connectors on the back side of the printed circuit board that electrically couple the micro-speaker to the back side of the printed circuit board.

11. The mobile terminal of claim 4 wherein the opening is in a side of the housing.

12. The mobile terminal of claim 11 further comprising a receiver speaker coupled to the front side of the printed circuit board and having an opening in a front face of the housing.

13. The mobile terminal of claim 12 wherein the back tuning volume has a volume selected to provide a desired amplitude response in a bass frequency range from about 300 hertz (Hz) to about 900 Hz.

14. The mobile terminal of claim 12 further comprising a grommet positioned in the housing and wherein the micro-speaker is positioned in the grommet and the grommet is configured to provide a seal between the front and back faces of the micro-speaker.

15. The mobile terminal of claim 1 further comprising a grommet positioned in the housing and wherein the micro-speaker is positioned in the grommet and the grommet is configured to provide a seal between the front and back faces of the micro-speaker.

16. The mobile terminal of claim 15 wherein the grommet defines a first forward tuning volume adjacent the back face of the micro-speaker.

17. The mobile terminal of claim 16 wherein the grommet further defines the passageway and a second forward tuning volume adjacent the opening.

18. The mobile terminal of claim 17 wherein the second forward tuning volume extends along the side of the housing past the opening.

19. The mobile terminal of claim 18 wherein the grommet further comprising a stiffener wall positioned between sides of the opening.

20. The mobile terminal of claim 4 further comprising a second forward tuning volume in fluid communication with the passageway and positioned at a location between the first forward tuning volume and the opening in the housing, the second forward tuning volume, the first forward tuning volume and the passageway defining a double-resonator that tunes a frequency response of the micro-speaker.

21. The mobile terminal of claim 20 wherein the frequency response of the micro-speaker is tuned to provide an amplitude response in a voice frequency range and a high amplitude response, greater than the response in the voice frequency range, at an alert frequency.

22. The mobile terminal of claim 21 wherein the minimum amplitude response in the voice frequency range is at least about −20 decibels (dB) and wherein the alert frequency is between about 3000 hertz (Hz) and about 4000 Hz.

23. The mobile terminal of claim 21 wherein the minimum amplitude response in the voice frequency range is at least about −10 decibels (dB).

24. The mobile terminal of claim 22 wherein the frequency response of the micro-speaker is tuned to provide an amplitude response in an extended frequency range above the voice frequency range.

25. The mobile terminal of claim 24 wherein the amplitude response in the extended frequency range is at least about −20 decibels (dB) and wherein the extended frequency range is up to at least about 8000 hertz (Hz).

26. The mobile terminal of claim 21 wherein the alert frequency is a first resonance frequency of the double-resonator greater than about 3000 hertz (Hz) and wherein a second resonance frequency of the double-resonator, greater than the first resonance frequency, is selected to provide an extended frequency range above the voice frequency range.

27. The mobile terminal of claim 26 wherein the second resonance frequency is between about 6000 hertz (Hz) and about 8000 hertz (Hz).

28. The mobile terminal of claim 21 wherein the opening has an area of less than about 10 square millimeters (mm$^2$).

29. The mobile terminal of claim 21 wherein the micro-speaker has a bandwidth of at least about 8000 hertz (Hz).

30. The mobile terminal of claim 21 wherein the micro-speaker has a bandwidth of at least about 10000 hertz (Hz).

31. The mobile terminal of claim 21 wherein the micro-speaker has a diameter of between about 10 millimeters (mm) and about 20 mm.

32. The mobile terminal of claim 21 further comprising;
a receiver that receives voice signals from a wireless communications network; and
a controller that decodes the voice signals and provides the decoded voice signals to the micro-speaker.

33. The mobile terminal of claim 32 wherein the frequency response of the micro-speaker is tuned to provide a minimum amplitude response of about −20 decibels (dB) up to about 8000 hertz (Hz) and a high amplitude response, greater than the minimum amplitude response at an alert frequency between about 3000 hertz (Hz) and about 4000 Hz.

34. The mobile terminal of claim 4 wherein the antenna board is positioned adjacent a back side of the printed circuit board and wherein a keypad and/or a display are positioned on a front side of the printed circuit board and wherein the back face of the micro-speaker is electrically coupled to the back side of the printed circuit board.

35. The mobile terminal of claim 1 wherein the opening is in a side of the housing.

36. The mobile terminal of claim 35 further comprising a receiver speaker coupled to the front side of the printed circuit board and having an opening in a front face of the housing.

37. The mobile terminal of claim 1 wherein the back tuning volume has a volume selected to provide a desired amplitude response in a bass frequency range from about 300 hertz (Hz) to about 900 Hz.

38. The mobile terminal of claim 1 wherein the frequency response of the micro-speaker is tuned to provide an amplitude response in a voice frequency range and a high amplitude response, greater than the response in the voice frequency range, at an alert frequency.

39. The mobile terminal of claim 1 wherein the frequency response of the micro-speaker is tuned to provide an amplitude response in an extended frequency range above the voice frequency range.

40. The mobile terminal of claim 39 wherein the amplitude response in the extended frequency range is at least about −20 decibels (dB) and wherein the extended frequency range is up to at least about 8000 hertz (Hz).

41. The mobile terminal of claim 1 further comprising a filter on the back face of the micro-speaker.

42. A micro-speaker assembly, comprising:
a micro-speaker positioned in a housing;
a low frequency back tuning volume adjacent a front face of the micro-speaker;
a high frequency forward tuning volume adjacent a back face of the micro-speaker;
a passageway extending from the forward tuning volume to an opening in the housing.

43. The micro-speaker assembly of claim 42 further comprising an antenna board positioned in the housing that defines a wall of the back tuning volume.

44. A micro-speaker assembly comprising:
a micro-speaker positioned in a housing;
a low frequency back tuning volume adjacent a front face of the micro-speaker;
a high frequency forward tuning volume adjacent a back face of the micro-speaker;
a passageway extending from the forward tuning volume to an opening in the housing;
an antenna board positioned in the housing that defines a wall of the back tuning volume; and
a printed circuit board in the housing,
wherein the antenna board is electrically coupled to the printed circuit board and positioned at a selected distance from the printed circuit board to provide a desired frequency response, and
wherein the back tuning volume is positioned between the printed circuit board and the antenna board.

45. The micro-speaker assembly of claim 44 wherein the back tuning volume is closed and wherein the antenna board includes a passage extending from the back tuning volume configured to compensate the back tuning volume for changes in atmospheric pressure.

46. The micro-speaker assembly of claim 42 wherein the back tuning volume has a volume selected to provide a desired amplitude response in a bass frequency range from about 300 hertz (Hz) to about 900 Hz.

47. The micro-speaker assembly of claim 42 further comprising a grommet positioned in the housing and wherein the micro-speaker is positioned in the grommet and the grommet is configured to provide a seal between the front and back faces of the micro-speaker.

48. The micro-speaker assembly of claim 47 wherein the grommet defines a first forward tuning volume adjacent the back face of the micro-speaker.

49. A micro-speaker assembly comprising:
a micro-speaker positioned in a housing;
a low frequency back tuning volume adjacent a front face of the micro-speaker;
a high frequency forward tuning volume adjacent a back face of the micro-speaker;
a passageway extending from the forward tuning volume to an opening in the housing; and
a grommet positioned in the housing,
wherein the micro-speaker is positioned in the grommet and the grommet is configured to provide a seal between the front and back faces of the micro-speaker wherein the grommet defines a first forward tuning volume adjacent the back face of the micro-speaker, and wherein the grommet further defines the passageway and a second forward tuning volume adjacent the opening.

50. The micro-speaker assembly of claim 49 wherein the second forward tuning volume extends along the side of the housing past the opening.

51. The micro-speaker assembly of claim 50 wherein the grommet further comprising a stiffener wall positioned between sides of the opening.

52. A micro-speaker assembly comprising:
a micro-speaker positioned in a housing;
a low frequency back tuning volume adjacent a front face of the micro-speaker;
a high frequency forward tuning volume adjacent a back face of the micro-speaker;
a passageway extending from the forward tuning volume to an opening in the housing; and
a second forward tuning volume in fluid communication with the passageway and positioned at a location between the first forward tuning volume and the opening in the housing, the second forward tuning volume, the first forward tuning volume and the passageway defining a double-resonator that tunes a frequency response of the micro-speaker.

53. The micro-speaker assembly of claim 52 wherein the frequency response of the micro-speaker is tuned to provide an amplitude response in a voice frequency range and a high amplitude response, greater than the response in the voice frequency range, at an alert frequency.

54. The micro-speaker assembly of claim 52 wherein the frequency response of the micro-speaker is tuned to provide an amplitude response in a voice frequency range and an extended frequency range from the voice frequency range up to at least about 8000 hertz (Hz), and wherein the frequency response of the micro-speaker is further tuned to provide a high amplitude response, greater than the response in the voice frequency range, at an alert frequency of less than about 8000 Hz.

55. The micro-speaker assembly of claim 54 wherein the amplitude response in the voice frequency range and the extended frequency range is at least about −20 decibels (dB) and wherein the alert frequency is between about 3000 hertz (Hz) and about 4000 Hz.

56. The micro-speaker assembly of claim 52 wherein the micro-speaker has a diameter of between about 10 millimeters (mm) and about 20 mm.

57. The micro-speaker assembly of claim 52 wherein the double-resonator extends the frequency response of the micro-speaker above a voice frequency range.

58. A mobile terminal, comprising:
a portable housing;
a micro-speaker positioned in the housing;
an acoustically closed low frequency back tuning volume adjacent a front face of the micro-speaker;
a high frequency forward tuning volume adjacent a back face of the micro-speaker;
a passageway extending from the forward tuning volume to an opening in the housing.

59. The mobile terminal of claim 58 further comprising an antenna board positioned in the housing that defines a wall of the back tuning volume.

60. The mobile terminal of claim 59 further comprising a printed circuit board in the housing and wherein the antenna board is electrically coupled to the printed circuit board and positioned at a selected distance from the printed circuit board to provide a desired frequency response and wherein the back tuning volume is positioned between the printed circuit board and the antenna board.

61. A micro-speaker assembly, comprising:
a micro-speaker positioned in a housing;
an acoustically closed low frequency back tuning volume adjacent a front face of the micro-speaker;
a high frequency forward tuning volume adjacent a back face of the micro-speaker; a passageway extending from the forward tuning volume to an opening in the housing.

62. The micro-speaker assembly of claim 61 further comprising an antenna board positioned in the housing that defines a wall of the back tuning volume.

63. The mobile terminal of claim 1, further comprising a passage extending from the low frequency tuning volume to outside the low frequency tuning volume configured to compensate the low frequency tuning volume for changes in atmospheric pressure.

64. The micro-speaker assembly of claim 42, further comprising a passage extending from the low frequency tuning volume to outside the low frequency tuning volume configured to compensate the low frequency tuning volume for changes in atmospheric pressure.

\* \* \* \* \*

UNITED STATES PATENT AND TRADEMARK OFFICE
CERTIFICATE OF CORRECTION

PATENT NO. : 7,260,364 B2  
APPLICATION NO. : 10/449523  
DATED : August 21, 2007  
INVENTOR(S) : William Chris Eaton Page 1 of 1

It is certified that error appears in the above-identified patent and that said Letters Patent is hereby corrected as shown below:

<u>Column 11</u>  
Line 63, delete the second "wherein".

Signed and Sealed this

Eighteenth Day of December, 2007

JON W. DUDAS  
*Director of the United States Patent and Trademark Office*